(12) United States Patent
Wilson

(10) Patent No.: US 11,192,653 B2
(45) Date of Patent: Dec. 7, 2021

(54) PNEUMATICALLY ACTUATED VEHICLE SEAT ASSEMBLIES

(71) Applicant: B/E Aerospace, Inc., Winston-Salem, NC (US)

(72) Inventor: Christopher Wilson, Clemmons, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/747,756

(22) Filed: Jan. 21, 2020

(65) Prior Publication Data
US 2021/0221515 A1    Jul. 22, 2021

(51) Int. Cl.
*B64D 11/06* (2006.01)
*B60N 2/22* (2006.01)
*B60N 2/90* (2018.01)

(52) U.S. Cl.
CPC .............. *B64D 11/064* (2014.12); *B60N 2/22* (2013.01); *B60N 2/995* (2018.02); *B64D 11/0643* (2014.12); *B64D 11/0649* (2014.12); *B60N 2/914* (2018.02)

(58) Field of Classification Search
CPC .............. B64D 11/064; B64D 11/0642; B64D 11/0644; B64D 11/0649; B64D 11/0643; B60N 2/22; B60N 2/2222; B60N 2/995; B60N 2/914
See application file for complete search history.

(56) References Cited

U.S. PATENT DOCUMENTS

| 3,330,598 | A | * | 7/1967 | Whiteside | A47C 4/54 297/284.3 |
|---|---|---|---|---|---|
| 4,204,657 | A |   | 5/1980 | Graham |   |
| 5,082,326 | A | * | 1/1992 | Sekido | B60N 2/914 297/284.6 |
| 5,137,329 | A | * | 8/1992 | Neale | A47C 7/467 297/284.6 |
| 5,354,117 | A | * | 10/1994 | Danielson | A47C 3/02 297/180.15 |
| 6,402,245 | B1 |   | 6/2002 | Newton et al. |   |

(Continued)

FOREIGN PATENT DOCUMENTS

| DE | 10147060 A1 | * | 4/2003 | ............... B60N 2/26 |
|---|---|---|---|---|
| DE | 10158876 A1 | * | 6/2003 | ............... B60N 2/20 |

(Continued)

OTHER PUBLICATIONS

Extended Search Report for European Application No. 21152172.9 dated Mar. 11, 2021, 6 pages.

*Primary Examiner* — Timothy J Brindley
(74) *Attorney, Agent, or Firm* — Suiter Swantz pc llo

(57) ABSTRACT

Vehicle seat assemblies including support structures having at least two supports parts coupled at an articulating joint and a pneumatic actuator system including at least one pneumatic chamber inflated and deflated to articulate the articulating joint to move one support part relative to the other or to synchronize movement of two support parts. Support structures can include a backrest coupled to a seat bottom or leg rest coupled to a seat bottom, wherein articulation of the joint causes movement of the backrest or leg rest along a non-hinged trajectory to change a sitting position of the support structure, change seat orientation, and generally improve seat comfort.

5 Claims, 10 Drawing Sheets

(56) References Cited

U.S. PATENT DOCUMENTS

| | | | |
|---|---|---|---|
| 9,061,765 B2 | 6/2015 | Vazguez et al. | |
| 9,937,826 B2 | 4/2018 | Dry | |
| 10,065,534 B1 | 9/2018 | Line et al. | |
| 10,246,193 B1 | 4/2019 | Finlay | |
| 10,434,918 B2 | 10/2019 | Raines | |
| 2008/0296946 A1 | 12/2008 | Reynolds et al. | |
| 2016/0229316 A1* | 8/2016 | Tamura | B60N 2/914 |
| 2017/0036634 A1* | 2/2017 | Ohno | B60N 2/90 |
| 2017/0080834 A1* | 3/2017 | Dry | B60N 2/643 |
| 2018/0257534 A1 | 9/2018 | Mizoi et al. | |
| 2018/0272904 A1* | 9/2018 | Line | B60N 2/34 |
| 2018/0281631 A1* | 10/2018 | Line | B60N 2/22 |
| 2020/0223325 A1* | 7/2020 | Pinkelman | F03G 7/065 |
| 2020/0238874 A1* | 7/2020 | Mazzucchelli | B60N 2/665 |
| 2021/0094454 A1* | 4/2021 | Humer | A47C 7/506 |

FOREIGN PATENT DOCUMENTS

| | | | | |
|---|---|---|---|---|
| DE | 102006037521 A1 * | 5/2007 | | B60N 2/914 |
| DE | 202018106581 U1 * | 10/2019 | | B60N 2/914 |
| EP | 0558408 A1 * | 9/1993 | | B60N 2/914 |
| JP | 63232046 A * | 9/1988 | | B60N 2/66 |
| WO | 2015104676 A1 | 7/2015 | | |
| WO | WO-2015140269 A1 * | 9/2015 | | B60N 2/0224 |

* cited by examiner

PNEUMATICALLY ACTUATED VEHICLE SEAT ASSEMBLIES

BACKGROUND

Vehicle seats commonly include adjustable components for improving seat comfort, changing seat orientation, and changing sitting position. In aircraft passenger seats adjustability can be provided to move one or more of a backrest, seat bottom, leg rest, headrest, and armrests. Adjustability can also be provided internal to the seat to adjust lumbar and side bolsters of the backrest. While different seats can have different adjustability, economy class seats typically have less adjustability as compared to premium class seats due to the space and cost constraints associated with economy class seating.

Adjustability in conventional seats is provided using systems that include mechanical actuators and rigid linkages to achieve desired motions. For example, electromechanical actuators can be used to drive mechanical linkages to transition a seat between upright and reclined, and in some cases between upright and full berth. Other systems can include hydraulic actuators for returning a seat component to an original position, such as a backrest to upright. Regardless of actuator type, conventional actuation systems tend to be complex, heavy, and require moving parts prone to wear and failure, making them undesirable for use in some applications.

Thus, there exists a need for seat adjustment in a predictable manner without the need for mechanical actuators and rigid connections.

BRIEF SUMMARY OF THE INVENTION

To achieve the foregoing and other aspects, in a first embodiment the present invention provides a vehicle seat assembly including a support structure having a first support part and a second support part coupled at an articulating joint, and a pneumatic actuator positioned within the support structure having at least one pneumatic chamber adjustable by inflating and deflating to articulate the joint to cause relative movement between the first support part and the second support part.

In some embodiments, the assembly may further include a range limiter coupled to each of the first support part and the second support part for limiting relative movement between the first support part and the second support part.

In some embodiments, the range limiter may be positioned within the support structure and may be a continuous inflexible member extending along portions of the first and second support parts.

In some embodiments, the range limiter may be a mechanical linkage having a guide track coupled to one of the first support part and second support part, and a guide coupled to the other of the first support part and the second support part, the guide configured to travel along the guide track as the at least one pneumatic actuator inflates and deflates, the guide track having a first end limiting travel of the first support part in a first direction and a second end limiting travel of the first support part in a second direction opposite the first direction.

In some embodiments, the assembly may further include an air source coupled in fluid communication to the pneumatic actuator, the air source positioned with the vehicle seat assembly or remote from the vehicle seat assembly.

In some embodiments, the at least one pneumatic chamber may be divided into a plurality of chambers with each chamber configured to inflate and deflate independently of the others or the plurality of chambers configured to inflate and deflate according to a predetermined sequence.

In some embodiments, the first support part may be a backrest and the second support part may be a seat bottom and the backrest may be adjustable in angle relative to the seat bottom about the articulating joint, and the at least one pneumatic chamber may deflate to increase the angle between the backrest and the seat bottom and inflate to decrease the angle between the backrest and the seat bottom.

In some embodiments, the first support part and the second support part may be continuously formed and the articulating joint may a non-hinged joint.

In some embodiments, the support structure may further include a third support part coupled to the second support part at a second articulating joint, wherein the pneumatic actuator is divided to form a first pneumatic chamber inflated and deflated to articulate the articulating joint to move the first support part relative to the second support part and a second pneumatic chamber inflated and deflated to articulate the second articulating joint to move the third support part relative to the second support part.

In some embodiments, each of the first support part and the second support part may include a cushion and a portion of the pneumatic actuator may be disposed in each cushion.

In some embodiments, the first support part may be a seat bottom and the second support part may be a leg rest, wherein the articulating joint is provided at a transition between the seat bottom and the leg rest, and wherein the at least one pneumatic chamber of the pneumatic actuator inflates to deploy the leg rest in a direction toward horizontal and deflates to stow the leg rest in a direction toward vertical.

In a second embodiment the present invention provides an aircraft passenger seat assembly including a support structure including a backrest and a seat bottom coupled at a non-hinged articulating joint, a pneumatic actuator positioned within the support structure having at least one pneumatic chamber adjustable by inflating and deflating to articulate the non-hinged articulating joint to move the backrest relative to the seat bottom, and a range limiter coupled to each of the backrest and the seat bottom for limiting motion between the backrest and the seat bottom.

In some embodiments, the at least one pneumatic chamber may inflate to increase an angle between the backrest and the seat bottom and deflate to decrease the angle between the backrest and the seat bottom.

In some embodiments, the at least one pneumatic chamber may deflate to increase an angle between the backrest and the seat bottom and inflate to decrease the angle between the backrest and the seat bottom.

In some embodiments, the range limiter may include a continuous inflexible member positioned within the support structure extending continuously along a portion of each of the backrest and seat bottom, the range limiter determining a maximum angle between the backrest and the seat bottom and a minimum angle between the backrest and seat bottom.

In some embodiments, the range limiter may be a mechanical linkage including a guide track coupled to the seat bottom and a guide coupled to the backrest, the guide configured to travel along the guide track as the at least one pneumatic actuator inflates and deflates, the guide track having a first end limiting travel of the backrest in a first direction and a second end limiting travel of the backrest in a second direction opposite the first direction.

In some embodiments, the backrest and the seat bottom may be continuous and the non-hinged articulating joint may be provided at a transition between the backrest and the seat bottom, and wherein the pneumatic actuator is positioned within the support structure and extends continuously along a portion of each of the backrest and seat bottom.

In some embodiments, the support structure may further include a leg rest coupled to the seat bottom at a second non-hinged articulating joint, the pneumatic actuator comprising a first pneumatic chamber that inflates and deflates to change an angle of the backrest and a second pneumatic chamber that inflates and deflates to change an angle of the leg rest, and wherein inflation and deflation of the first and second pneumatic chambers is synchronized or mutually exclusive.

In some embodiments, the backrest, the seat bottom, and the leg rest include a continuous cushion and the pneumatic actuator is disposed in the cushion.

Embodiments of the invention may include one or more or any combination of the above aspects, features and configurations.

BRIEF DESCRIPTION OF THE DRAWINGS

Implementations of the embodiments disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
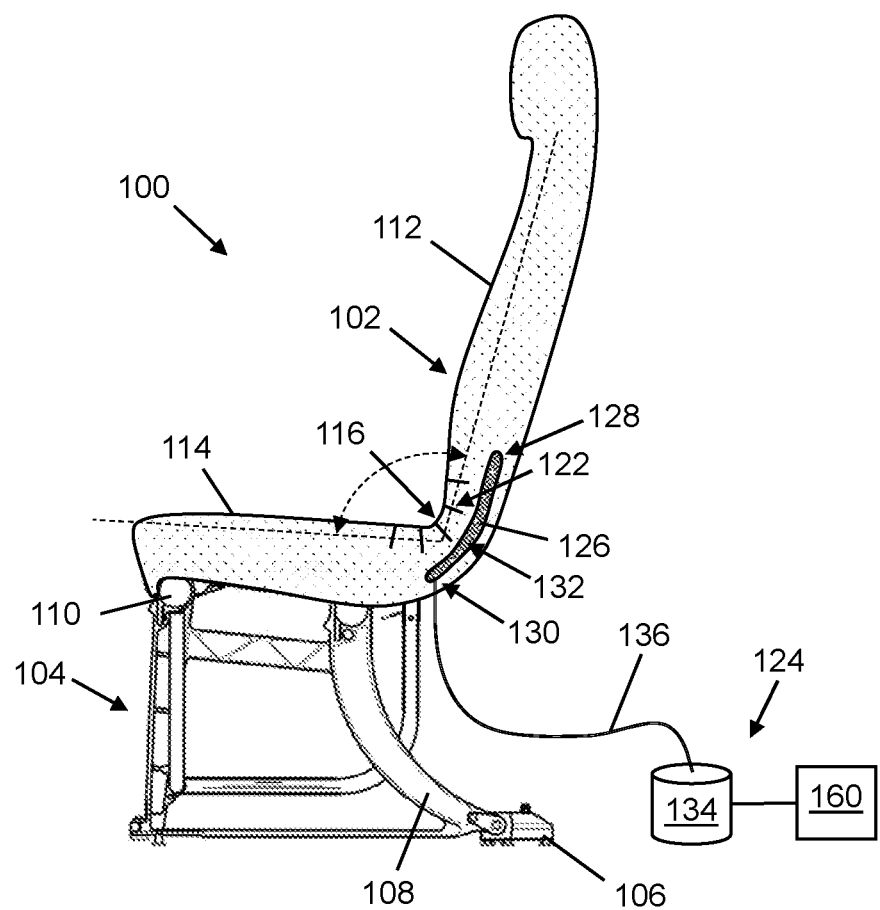
FIG. 1A is a side view of a vehicle seat assembly including a pneumatic actuator shown deflated to position a seat backrest in an upright TTOL-compliant position.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Exemplary embodiments disclosed herein are directed to seat assemblies including actuation systems for achieving predictable component movement without the need for mechanical and/or electromechanical actuators. Actuation systems disclosed herein include pneumatic or "soft" actuators that operate by inflating and deflating to cause component movement along a hinged or non-hinged trajectory. Seat components, also referred to herein as seat elements, can include, but are not limited to, support elements for supporting a passenger such as a backrest, seat bottom, leg rest, armrest, headrest, internal elements such as lumbar support, and components separate from but associated with a seat such as an ottoman, infill assemblies, furniture, console, etc. Actuation systems disclosed herein are compatible for use in monuments and furniture in a vehicle cabin environment. While seats shown in the drawings illustrate examples of aircraft passenger seats, the seats shown are not intended to be limiting as the actuation systems disclosed herein are compatible for use with all types of seats including passenger seats, crew seats, cabin attendant seats, pilot seats, etc. The vehicle seat examples shown are non-limiting examples of seats for use in vehicles such as aircraft, motor vehicles, buses, trains, boats, and any other vehicle type having a seat or seats benefiting from a pneumatic actuation system. The systems disclosed herein are compatible for use with other capabilities of a seat such as climatization and swivel assemblies.

Actuation systems include at least one pneumatic actuator that operates by inflating and deflating a chamber or chambers, interconnected or separate, to provide predictable movements that, for example, can be used to change sitting position, change seat orientation, improve seat comfort, etc. Systems generally include a support structure including at least one seat element, and preferably at least two seat elements, coupled at an articulating joint about which relative movement between the seat elements occurs. Movement can be pivoting movement in which one component pivots relative to another about the articulating joint. Movement can also be rotational movement and translational movement and combinations thereof. Movements are not limited to the degrees of freedom of a rigid actuator system.

Pneumatic systems include at least one pneumatic actuator that inflates and deflates to articulate the joint, which may be hinged or non-hinged. For example, the pneumatic actuator may inflate to increase the angle between components and deflate to decrease the angle between components, or vice versa. Movements can include backrest recline, leg rest deployment, headrest adjustment, seat bottom translation, etc., and combinations thereof. The pneumatic actuator can operate in different states of inflation such as fully inflated, fully deflated, and states of inflation between fully inflated and fully deflated. The terms "full" and "fully" are intended to mean the ends of the operating range ends and not necessarily total deflation or maximum inflation. States of inflation may be discrete or infinite between the ends of the operating range. An air supply or air source such as a pump or air compressor operates to actuate the pneumatic actuator to articulate the joint.

Pneumatic actuation systems of the present invention provide several advantages over conventional actuation systems including, but not limited to, simplicity, cost savings, lightweight, compact packaging, reliability, ergonomic adjustment, enhanced freedom of design of seats, and organic motions not limited to the degrees of freedom of rigid actuation systems.

FIG. 1A shows a non-limiting example of a vehicle seat assembly 100, such as an aircraft passenger seat assembly equipped with a pneumatic actuation system according to the present invention. The seat assembly 100 generally includes a support structure 102 positioned atop a base 104 configured to be secured to a floor or deck. Track fasteners 106 may secure the base 104 to seat tracks. The base 104 may include rigid frame members such as legs 108 and transverse beams 110. The base configuration is not intended to be limiting and other base configurations are possible. The seat assembly 100 may be standalone or part of an assembly having multiple seats forming a row. The base 104 serves to support the support structure 102 and portions of the support structure may move relative to the base as the support structure changes in position. The seat assembly 102 is shown without portions of the spreaders, coverings and armrest for clarity of the support structure. Armrests may be provided on opposing sides of the seat and an armrest may be shared between adjacent seats.

The support structure 102 generally includes one or more interconnected parts that serve to support a passenger as a seat or bed. As shown, the support structure 102 includes a backrest 112 and a seat bottom 114, which are continuously formed and coupled together at an articulating joint 116 such as a flexible or non-hinged joint. The articulating joint 116 may be a rigid mechanical connection or soft connection about which the support structure bends. As shown, the articulating joint 116 is a non-hinged articulating joint about which the backrest 112 moves relative to the seat bottom 114 to recline the backrest. Movement can be pivoting movement and pivoting movement combined with translation, both resulting in a change in angle between the backrest and seat bottom. The seat bottom 114 sits atop the base and can be coupled to the base 104 through intermediate frame members. The backrest 112 can be supported by the seat bottom 114, for example, by reinforced layers internal to the support structure 102.

The support structure 102 can include both rigid and soft materials. Rigid materials can be in the form of flexible and inflexible metal components, fiber-reinforced layers, etc. Soft materials can include cushions, dress covers, etc. The support structure 102 as shown includes an internal cushion (s) 118 and dress cover 120 for comfort, protection and aesthetics. The dress cover 120 can be continuous about the backrest 112 and seat bottom 114 or divided into segments. The backrest 112 and seat bottom 114 can also be continuously formed with the internal cushion(s) being continuous or divided into segments. Fiber reinforcement 122 can be incorporated into the cushions and or dress cover, for example, positioned about the articulating joint 116. Cushion materials can include open-cell foam form comfort, closed-cell foam for flotation, additively manufactured elastomeric lattices, and combinations thereof. The support structure 102 can include additional materials such as adhesive layers, fire-blocking materials, etc., common in aircraft passenger seat constructions.

The pneumatic actuation system 124 includes at least one pneumatic actuator 126 positioned within the support structure 102 near or at the articulating joint 116. In some embodiments, the pneumatic actuator 126 includes a first part 128 that extends along a portion of a first part of the support structure 102, such as the backrest 112, and a second part 130 that extends along a portion of a second part of the support structure, such as the seat bottom. The first and second parts 128, 130 of the pneumatic actuator can be parts of the same pneumatic chamber adjustable by inflating and deflating to articulate the articulating joint 116 to cause relative movement between the first support part and the second support part, or can be separate segments of a divided chamber.

Figure 1B:
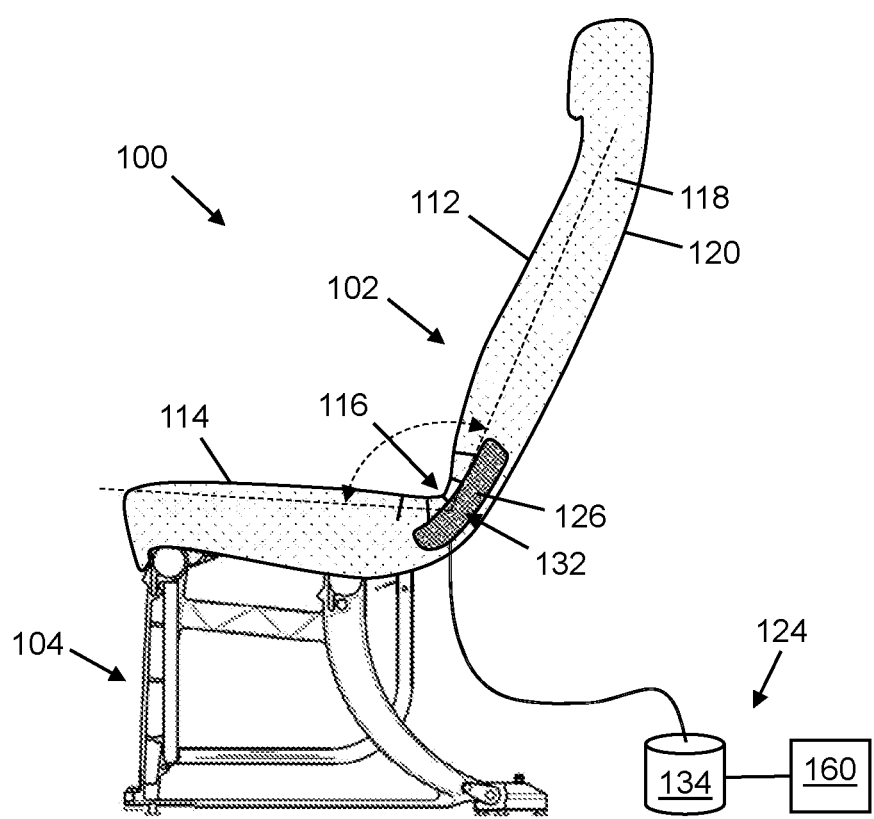
FIG. 1B is a side view of the vehicle seat assembly of FIG. 1A showing the pneumatic actuator inflated to position the seat backrest in a reclined in-flight position.

As shown in FIGS. 1A and 1B, the pneumatic actuator 126 includes at least one pneumatic chamber 132 adjustable by inflating and deflating change the angle between the backrest 112 and the seat bottom 114. FIG. 1A shows the pneumatic chamber 132 deflated to position the seat in an upright position for taxi, take-off and landing (TTOL). FIG. 16 shows the pneumatic chamber 132 deflated to position the seat in a reclined, in-flight sitting position. In some embodiments, the backrest 112 gradually reclines as the pneumatic chamber 132 inflates and gradually returns to upright as the pneumatic chamber 132 deflates, or vice versa. The fully inflated state of the pneumatic actuator 132 may correspond to fully reclined and the fully deflated state of the pneumatic actuator may correspond to fully upright. Fully inflated and fully deflated does not necessarily mean filling entirely and depleting entirely the air within the chamber. Intermediate states between fully upright and fully reclined can be achieved by partially filling or deflating the chamber. In some embodiments, the seat assembly 100 includes is able to lock in various sitting positions such as fully upright, fully reclined, and intermediate positions between fully upright and fully reclined. Locking can be achieved using a mechanical assembly that operates to lock the seat component(s) at a specific angle. Mechanisms may operate independently, or with the range limiter such as the guide track as discussed below.

An air supply 134, such as a pump or compressor, operates to supply air to and withdraw air from the at least one pneumatic chamber 132. The at least one pneumatic chamber 132 can be coupled in fluid communication to the air supply 134 by a supply conduit 136 such as a length of tubing. The conduit can be a single conduit or part of a lamer conduit network. The air supply 134 can be located with the seat assembly, for example, below the seat bottom, or located remote from the seat assembly 102. A single air supply 134 can be dedicated to each seat or serve multiple seats. The air supply 134 can be dedicated for seat adjustment or part of a lamer air supply system also serving other functions.

Figure 2A:
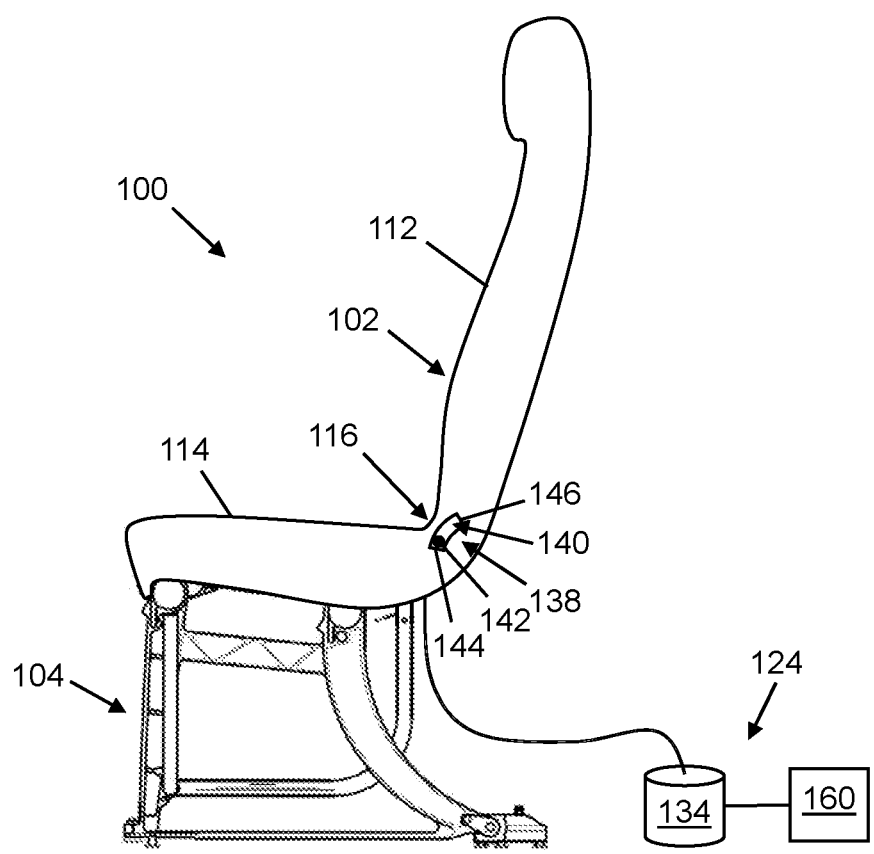
FIG. 2A is a side view of a vehicle seat assembly including an external range limiter compatible for use with the pneumatic actuator and showing the seat backrest in an upright position.
Figure 2B:
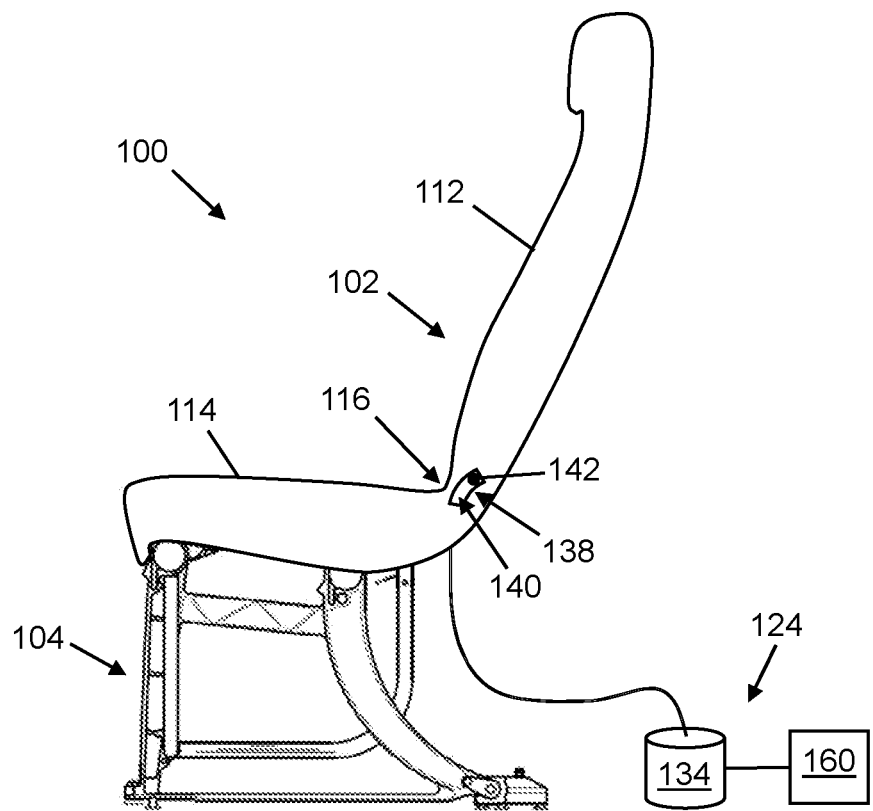
FIG. 2B is a side view of the vehicle seat assembly of FIG. 2A showing the seat backrest in a reclined position.

FIGS. 2A and 2B show a first embodiment of a range limiter 138 for use with the pneumatic actuation system 124. The range limiter 138 generally includes a first component coupled to the first support part and a second component coupled to the second support part, the range limiter configured to limit relative movement between the first and second support parts. The range limiter 138 can be positioned on one side of the seat or symmetrically on both sides. As shown, the range limiter 138 includes a guide track 140 coupled to the seat bottom 114 and a guide 142 coupled to backrest 112. The guide 142, which can be a post carried on the side of the backrest, 112 is configured to travel along the guide track 140 as the pneumatic actuator 126 inflates and deflates. The guide track 140 may have a first end 144 limiting travel of the backrest in a first direction and a second end 146 limiting travel of the backrest in a second direction opposite the first direction. The length of the guide track and capacity of the pneumatic chamber 132 can be customized to control the range of motion of the movable component, which in this example is the backrest 112. In some embodiments, a lock mechanism operates to secure the backrest 112 at a specific angle by securing the guide 142 at the ends of the guide track 140 to secure the backrest 112 fully upright or fully reclined when no movement is desired.

Figure 3A:
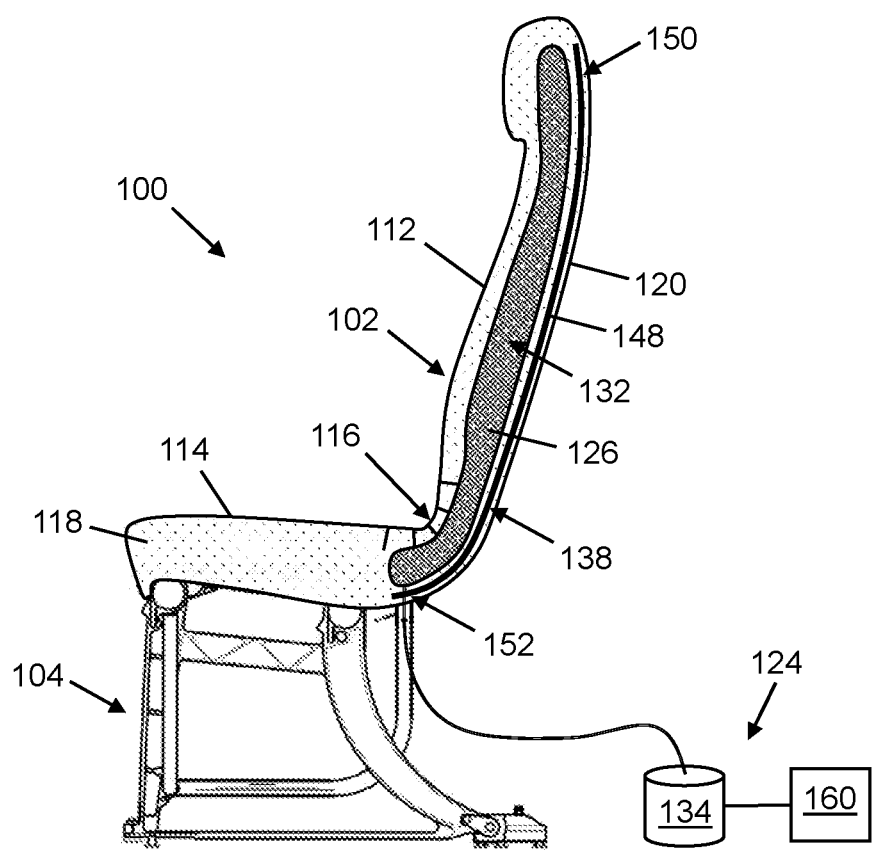
FIG. 3A is a side view of a vehicle seat assembly including an internal range limiter and pneumatic actuator shown inflated to position the seat backrest upright.
Figure 3B:
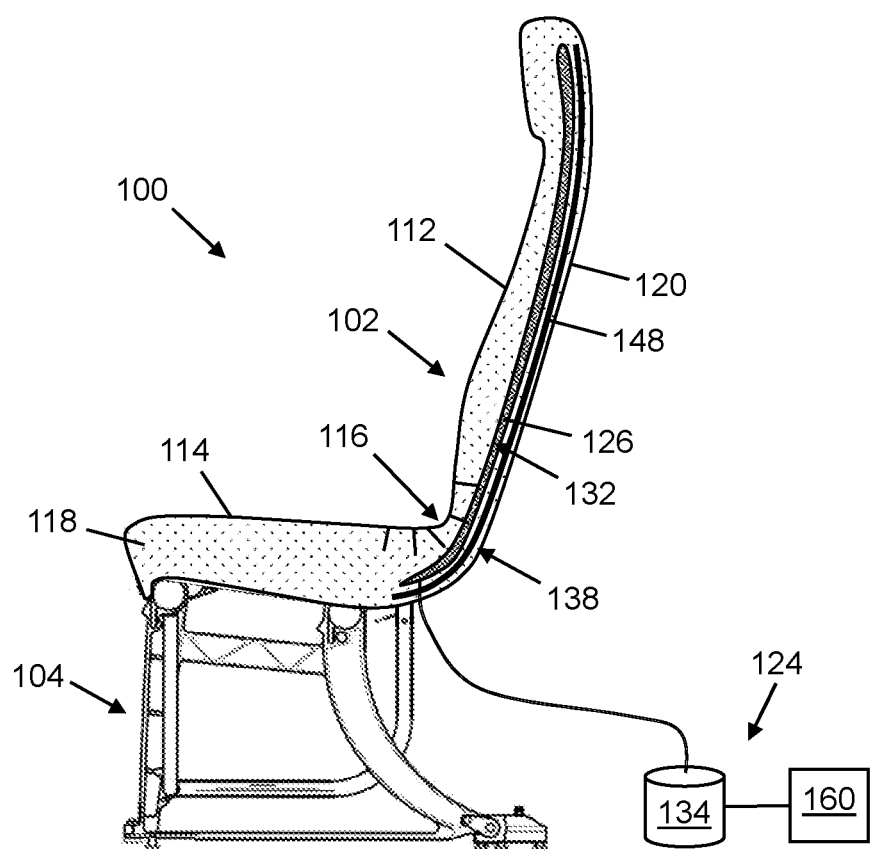
FIG. 3B is a side view of the vehicle seat assembly of FIG. 3A showing the pneumatic actuator deflated to recline the backrest against the internal range limiter.

FIGS. 3A and 3B show another embodiment of a range limiter 138 for use with the pneumatic actuation system 124 of the present invention. In some embodiments, the range limiter 138 can be formed as a continuous inflexible member 148 positioned within the support structure 102 adjacent the pneumatic actuator 126. The inflexible member 148 can have a first portion 150 that extends along a portion of a length of the backrest 112 and a second portion 152 that extends along a portion of the seat bottom 114. The first and second portions may be continuously formed. As shown in FIG. 3A, the pneumatic actuator 126 inflates to position the front of the backrest 112 at angle corresponding to an upright sitting position and as shown in FIG. 3B, the pneumatic actuator deflates to allow the front of the backrest to move toward the inflexible member 148 to angle the front of the backrest at an angle corresponding to a reclined sitting position. In the configuration shown, the angle of the backrest can be adjusted by inflating and deflating the pneumatic actuator 126. Other arrangements for the pneumatic actuator 126 and inflexible member 148 can be provided to adjust the backrest angle.

Figure 4A:
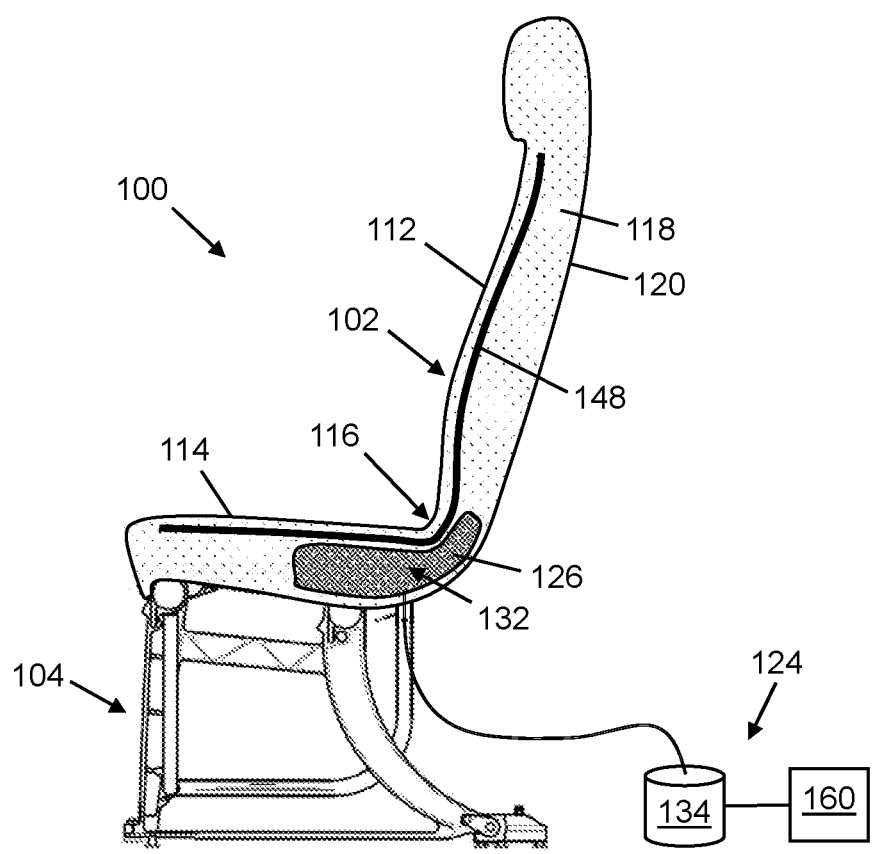
FIG. 4A is a side view of a vehicle seat assembly including an internal inflexible member and pneumatic actuator shown inflated to position the seat upright.
Figure 4B:
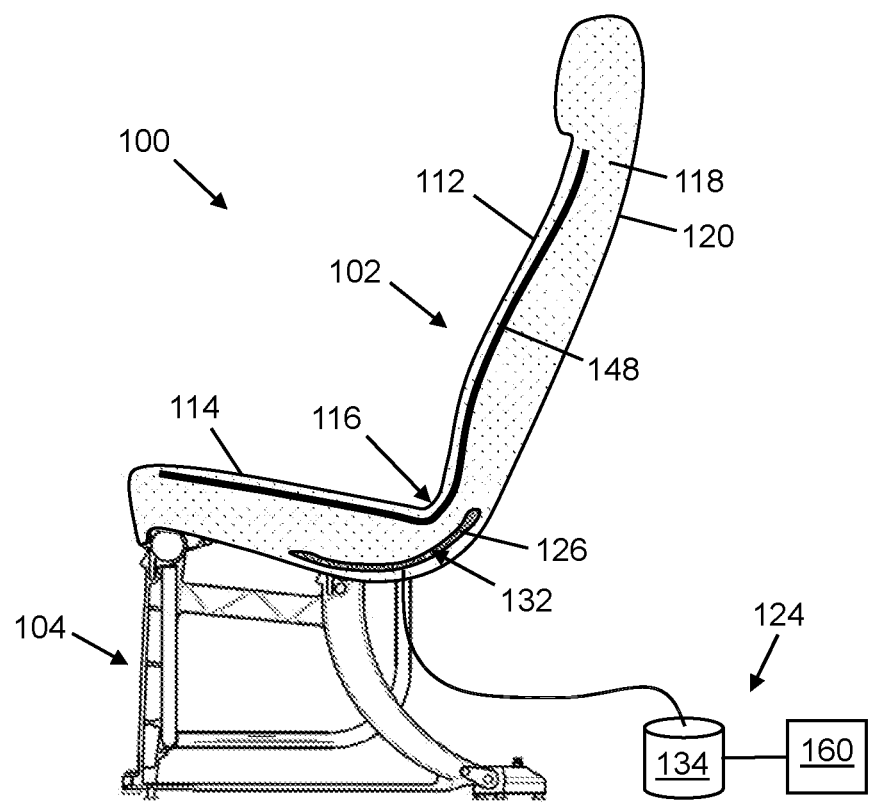
FIG. 4B is a side view of the vehicle seat assembly of FIG. 4A showing the pneumatic actuator deflated to recline the seat while maintaining a constant angle between the backrest and seat bottom.

FIGS. 4A and 4B show another implementation of the pneumatic actuation system 124. In this configuration, the support structure 102 includes an inflexible member 148 positioned within the support structure 102 above and/or forward of the pneumatic actuator 126. The inflexible member 148 maintains a constant angle between the backrest 112 and seat bottom 114 and the pneumatic actuator 126 inflates and deflates to pivot the support structure 102 while maintaining the constant seat angle. FIG. 4A shows the pneumatic actuator 126 in an inflated state to position the support structure 102 in an upright TTOL-compliant sitting position. FIG. 4B shows the pneumatic actuator 126 in a deflated state to position the support structure 102 in a cradle sitting position in which the seat bottom 114 is inclined and backrest 112 reclined for in-flight use.

Figure 5A:
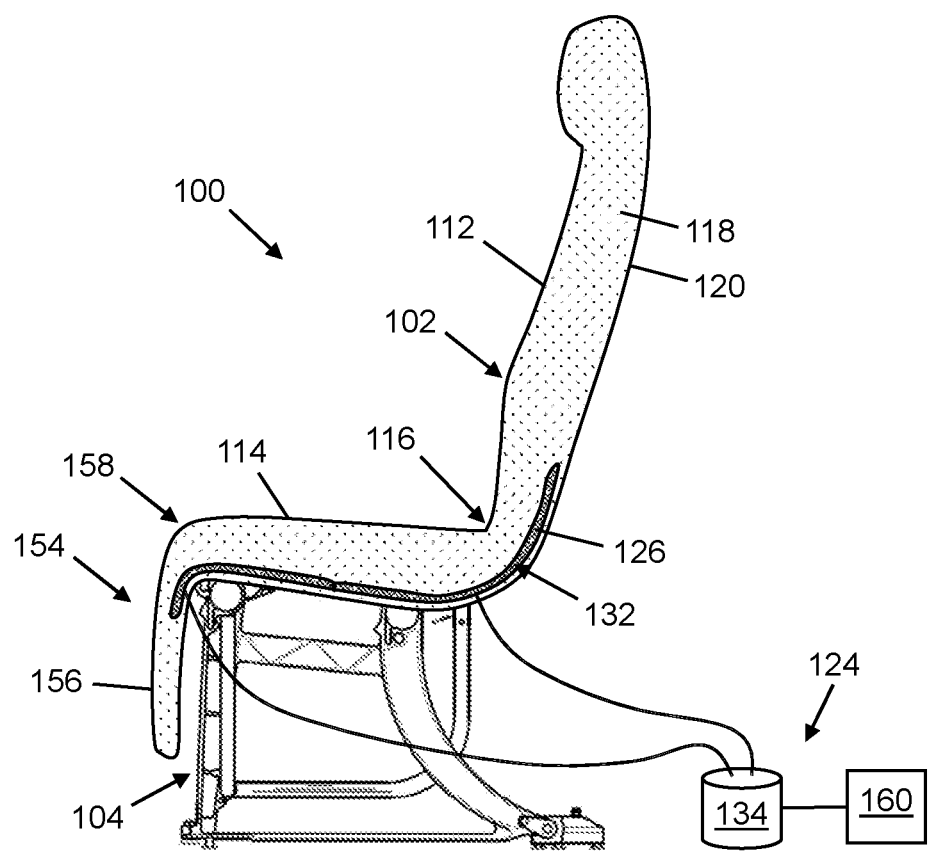
FIG. 5A is a side view of a vehicle seat assembly including a pneumatic actuator for adjusting a position of a seat support structure including a backrest, a seat bottom and a leg rest, showing the support structure in an upright sitting position for TTOL.
Figure 5B:
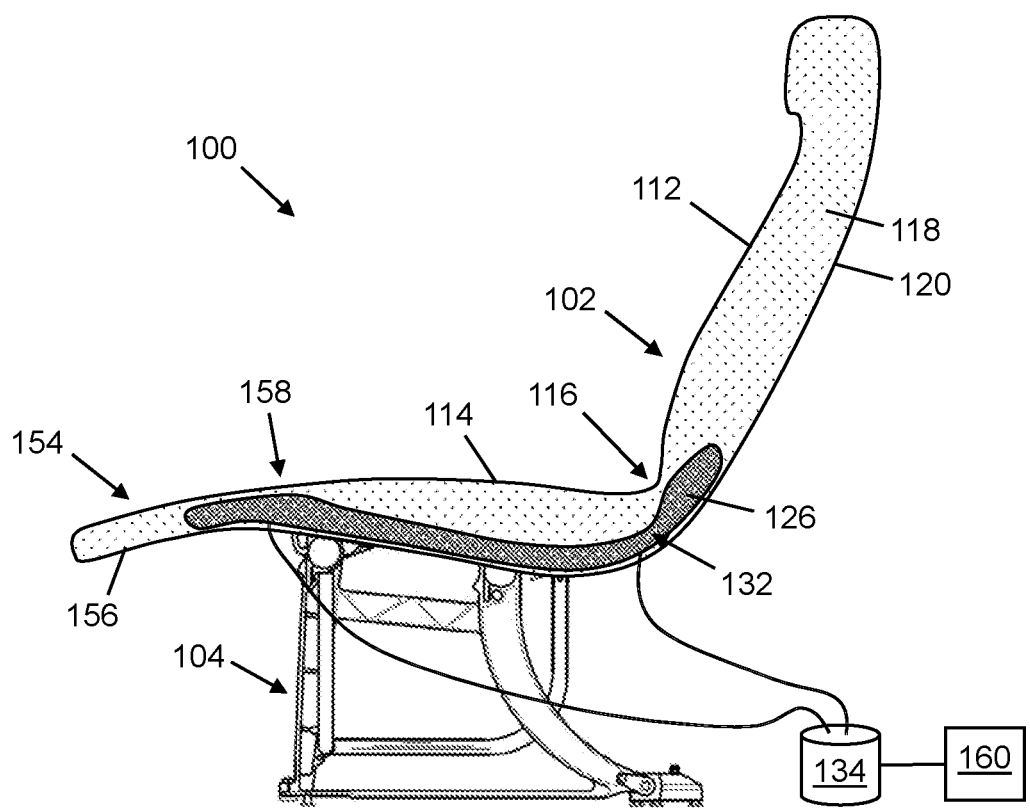
FIG. 5B is a side view of the vehicle seat assembly of FIG. 5A showing the pneumatic actuator inflated to recline the backrest and deploy the leg rest.

FIGS. 5A and 5B show another non-limiting example of a vehicle seat assembly. The support structure 102 further includes a third support part 154 provided as a leg rest 156 coupled at one end to the seat bottom 114 at a second non-hinged articulating joint 158. The pneumatic actuator 126, which may be a part of the same actuator or a divided actuator driving motion of the backrest, or may be a separate pneumatic actuator, inflates and deflates to articulate the second articulating joint 158 to move the lea rest 156 between stowed as shown in FIG. 5A and deployed as shown in FIG. 5B. In some embodiments, the pneumatic actuator 126 may be divided into two or more pneumatic chambers 132 each of which can be inflated and deflated independently or in sequence to move a different part of the support structure 102. Movement of the two or more parts of the support structure 102 can be synchronized or mutually exclusive. For example, a first pneumatic chamber can be inflated to move the leg rest 156 toward horizontal to deploy the leg rest, and deflated to allow the leg rest to return toward vertical for stowing, while a second pneumatic chamber can be inflated to recline the backrest 112 and deflated to move the backrest toward upright. The pneumatic actuator 126 can be formed as one continuous chamber or divided into segments. Segments can be formed by stitching or otherwise dividing and the size, shape, and capacity of the chambers can be customized to control motion and inflation sequence.

In some embodiments, the pneumatic actuation system 124 includes a controller 160 that operates to activate the supply 134 responsive to commands. The controller 160 may be operatively coupled to or an integral part of a passenger seat control interface. The control interface may be located on the seat assembly or in proximity thereto. The control interface may be collocated with the seat control features such that all seat comfort controls are provided in the same passenger device. Each individual passenger control interface may be networked with a master crew controller capable of overriding each individual seat controller. For example, all pneumatic actuation systems may be deactivated during TTOL and allowed to be selectively activated during flight.

The controller 160 can include a processor such as a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide area network (WAN), a local area network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions.

The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat assembly, comprising:
    a support structure including a backrest coupled to a seat bottom at a non-hinged articulating joint;
    a pneumatic actuator positioned within the support structure having at least one pneumatic chamber adjustable by inflating and deflating to articulate the non-hinged articulating joint to cause relative movement between the backrest and the seat bottom along a non-hinged trajectory; and
    a range limiter coupled to the backrest and the seat bottom limiting relative movement between the backrest and the seat bottom to a predetermined range;
    wherein the at least one pneumatic chamber deflates to increase an angle between the backrest and the seat bottom to recline the backrest, and inflates to decrease the angle between the backrest and the seat bottom.

2. The aircraft passenger seat assembly according to claim 1, wherein the at least one pneumatic chamber inflates to increase an angle between the backrest and the seat bottom and deflates to decrease the angle between the backrest and the seat bottom.

3. The aircraft passenger seat assembly according to claim 1, wherein the range limiter comprises a continuous inflexible member positioned within the support structure and extending continuously along a portion of a length of each of the backrest and the seat bottom.

4. The aircraft passenger seat assembly according to claim 1, further comprising an air source coupled in fluid communication to the pneumatic actuator, the air source positioned proximate the pneumatic actuator or remote from the pneumatic actuator.

5. The aircraft passenger seat assembly according to claim 1, wherein the backrest and the seat bottom are continuous and the non-hinged articulating joint is provided at a transition between the backrest and the seat bottom, and wherein the pneumatic actuator is positioned within the support structure and extends continuously along a portion of each of the backrest and the seat bottom.

* * * * *